April 16, 1929.                C. BETHEL                1,709,704
MOTOR SUSPENSION
Filed Sept. 22, 1923
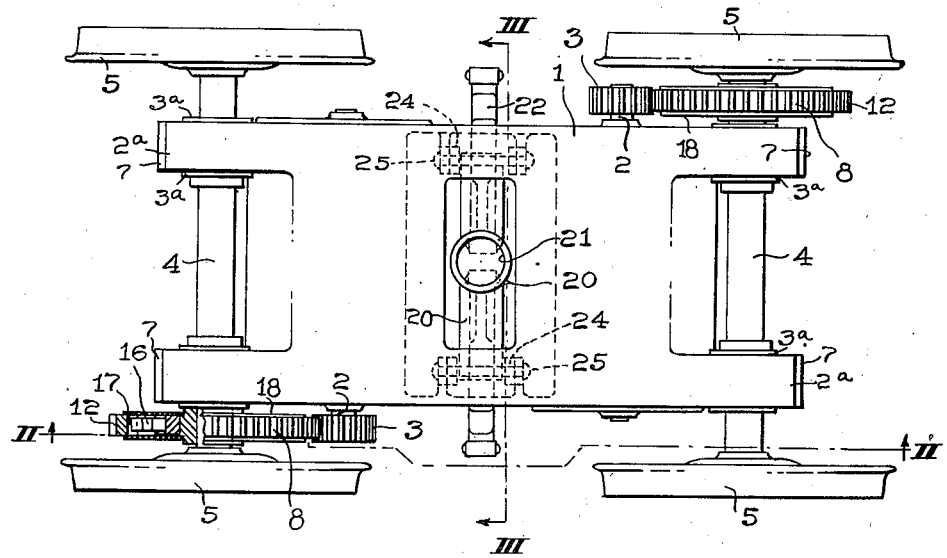
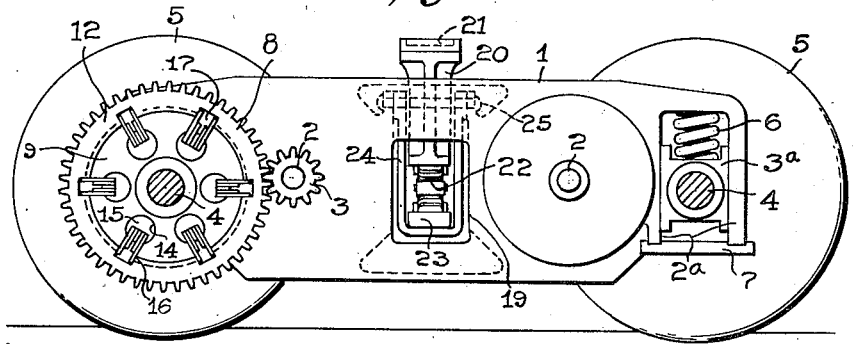
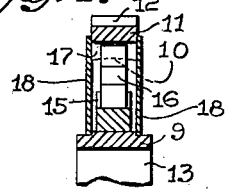
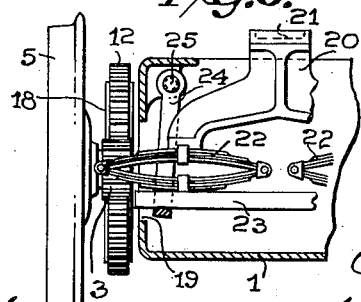
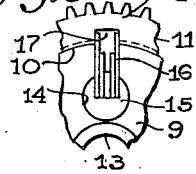
WITNESSES:
INVENTOR
Claude Bethel
BY
ATTORNEY Patented Apr. 16, 1929.

1,709,704

UNITED STATES PATENT OFFICE.

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR SUSPENSION.

Application filed September 22, 1923. Serial No. 664,235.

My invention relates, in general, to railway vehicles and, more particularly, to the driving trucks of electrically propelled vehicles.

The object of the invention is to provide a railway-vehicle truck in which the motor housings and the truck-frame member are formed integrally, and the resulting unitary structure is resiliently supported on the driving axles.

Heretofore, it has been the standard practice to utilize a truck structure comprising a frame which is resiliently mounted on the driving axles of the truck and serves to support independent driving motors.

In the present invention, the frames of the driving motors are cast to provide an integral structure which performs all of the functions of the standard truck frame. By reason of this construction, the motor housings are utilized for the double purpose of enclosing the motors and giving mechanical strength to the truck frame, thereby providing a truck frame having a small number of parts and of comparatively light and rigid construction. As a consequence of forming the motors and truck structure as an integral unit, the entire truck may be resiliently supported upon the wheel axles in such manner that the total unsprung weight of the truck is quite small in comparison with that of a truck embodying motors which are known in the art as axle-hung motors.

The foregoing and other objects of the invention may be attained by means of the structure described in the following specification and shown in the accompanying drawings, in which, Figure 1 is a plan view of a railway-vehicle truck embodying the principles of the invention, Fig. 2 is a view, partially in side elevation and partially in section, of the truck, taken along the line II—II of Fig. 1, Fig. 3 is a view, partially in section, of a fragmentary portion of the truck structure, taken along the line III—III of Fig. 1, Fig. 4 is a view, in cross section, of a fragment of the gear wheel utilized for transmitting power to the wheel axle of the truck, and, Fig. 5 is a view, in elevation, of the portion of the gear wheel corresponding to that shown in Fig. 4.

Referring particularly to Figs. 1 and 2, the railway-vehicle truck illustrated comprises twin motor housings and a truck-frame member 1, cast integrally. As shown, the motor housings are disposed back to back in the same general relative positions that the motor housings ordinarily occupy in a standard railway-vehicle truck.

In this embodiment of the invention, motor shafts 2 are mounted in the housings and, in order to establish driving connections, the shafts are extended through the frame. Since, in trucks of this type, one driving connection between each armature shaft and its corresponding car axle is sufficient, the shafts are extended through opposite sides of the frame so that the drives will be on opposite sides to give the desired balance to the whole structure. The truck-frame member 1 is provided, at each end, with pedestal jaws 2a which are cast integrally therewith, and journal boxes 3a are mounted in the jaws. As illustrated, axles 4, which are provided with wheels 5 secured to their ends, are rotatably mounted in the journal boxes 3a. In order that the entire truck-frame member 1 may be resiliently supported on the driving axles 4, coil-spring members 6 are interposed between the journal boxes 3a and the upper or closed ends of the pedestal jaws 2a. For closing the lower ends of the pedestal jaws 2a to constrain the journal boxes 3a therein, pedestal binders 7 are provided in the manner ordinarily employed in railway vehicles utilizing the standard pedestal-jaw construction for supporting journal bearings in side-frame members.

In order to transmit power from the armature shafts 2 to the resiliently mounted driving axles 4, spherically seated flexible gear wheels 8, such as the one shown in my Patent No. 1,602,298, may be utilized. Such gears, as disclosed in the patent, are adapted for the transmission of power between shafts which are subjected to conditions of misalignment. As shown clearly in Figures 4 and 5, the gear wheels 8 each comprise a hub member 9 having a spherically-curved periphery 10 which is disposed to receive a gear rim 11 having a correspondingly shaped inner surface. In such manner, the rim 11 may be mounted for universal movement. The rim 11 is provided with gear teeth 12 and is disposed to mesh with pinions 3 mounted on the armature shafts 2. In order to mount the gear wheels 8 on the driving axles 4 in the proper operating relation with the driving pinion 3, the hub member 9 is provided with a central opening 13 which is of suitable diameter to permit the gear wheel 8 to be pressed on the driving axle 4. For transmitting torque from the gear rim 11 to the driving axle 4, the hub 9 is provided with a plurality of circular openings 14 which are disposed to receive spring nests 15 having leaf springs 16 which extend radially into slotted openings 17 that are provided in the inner surface of the gear rim 11.

A plurality of spring side plates 18 are secured to the hub 9 and extended radially beyond the sides of the gear rim 11 to restrain the rim in axial alignment with the hub 9.

It will be readily seen that, when the railway-vehicle truck is in normal operation, such misalignment of the driving axles 4 and the armature shafts 2 as may occur will be permitted by means of the spherically seated gear wheels 8 without interfering in any way with the proper meshing of the teeth 12 on the gear rim 11 with the teeth on the driving pinion 3. Likewise, any sudden variations in angular velocity, between the wheel axles 4 and the armature shafts 2 which may result from sharp irregularities in the track over which the truck may be operating, will be absorbed by the leaf springs 16 in the gear wheels 8 without imposing excessive stresses on the gear teeth.

For supporting a car body or other vehicle (not shown) on the truck structure 1, a central opening 19, extending from side to side of the frame between the two motor housings, is provided to receive a swing bolster 20 of the usual construction, having a recess 21 in its upper portion that is adapted to receive a center pin on the vehicle body. As shown in Fig. 3, the lower bifurcated ends of the swing bolster 20 are respectively supported on elliptical springs 22 that are, in turn, mounted on a bolster plate 23. In order to permit lateral displacement of the bolster 20 relative to the truck frame 1, the plate 23 is supported at each end by means of swing links 24 which are pivotally connected to the upper portion of the housing 1 by means of pins 25.

From the foregoing description, it will be evident that a railway-vehicle truck embodying the features of the invention is of strong and rigid construction, of comparatively light weight, and has very little unsprung mass.

Although I have described a specific embodiment of the invention, it will be obvious to those skilled in the art that various modifications may be made in the manner of joining the motor frames and in the particular driving mechanism that is utilized without departing from the spirit and scope of the invention as defined in the appended claims.

I claim as my invention:—

1. A railway vehicle truck comprising an integral twin-motor housing supported on a plurality of wheel axles, said housing constituting the truck frame and having motor armatures mounted therein on shafts parallel to the wheel axles.

2. A railway vehicle truck comprising an integral twin-motor housing having motor armature shafts journalled therein resiliently supported on a plurality of wheel axles, said housing constituting the truck frame.

3. A railway vehicle truck comprising a unitary frame member for housing a plurality of motors, said member being journalled on a plurality of wheel axles to constitute the truck frame and gear trains operatively connecting said motors to the wheel axles.

4. A railway vehicle truck comprising a rigid unitary frame member for housing a plurality of motors mounted on armature shafts, said member being journalled on a plurality of wheel axles to constitute the truck frame.

5. A railway vehicle truck comprising an integral twin-motor housing having motor armature shafts journalled therein and a swing bolster mounting for carrying a center pin, said housing being journalled on a plurality of wheel axles of the truck.

6. A railway vehicle truck comprising an integral twin-motor housing having a swing bolster mounting for carrying a center pin, said housing being journalled on a plurality of wheel axles of the truck, motors having shafts mounted in the housing, and flexible gear trains connecting the shafts of said motors and said axles.

7. A railway vehicle truck comprising an integral twin-motor housing having a swing bolster mounting for carrying a center pin, said housing being journalled on a plurality of wheel axles of the truck and motor-armature shafts journalled in the housing, said axles and shafts being relatively movable.

8. A railway vehicle truck comprising an integral twin-motor housing having a swing bolster mounting for carrying a center pin, said housing being journalled on a plurality of wheel axles of the truck, motors having armature shafts mounted in the housing, and flexible gear trains connecting the shafts of said motors and said axles, said axles being movable relative to said frame.

9. A railway vehicle truck comprising a unitary motor housing and truck frame member, said member being resiliently journalled on a wheel axle, a motor within said housing and a gear train for operatively connecting said motor to said wheel axle.

10. A railway vehicle truck comprising a unitary motor housing and truck frame member, said member being resiliently journalled on a plurality of wheel axles and having an independent armature shaft journalled therein.

11. A railway vehicle truck comprising a unitary motor housing and truck frame member, said member being resiliently mounted on a plurality of wheel axles and having independent armature shafts journalled therein.

12. A railway vehicle truck comprising a unitary frame member for housing a plurality of motors, a plurality of wheel axles for supporting said housing and gear trains operatively connecting said motors to the wheel axles, said gear trains comprising spherically seated flexible gear wheels.

13. A railway vehicle truck comprising a unitary frame member for housing a plurality of motors, said member being resiliently supported on a plurality of wheel axles to constitute a truck frame and gear trains embodying spherically seated flexible gears for operatively connecting said motors to the wheel axles.

14. A railway vehicle truck comprising an integral twin-motor housing supported on a plurality of wheel axles, said housing constituting the truck frame, motor armature shafts journalled therein, pinions on said armature shafts and spherically seated flexible gear wheels on the wheel axles for cooperating with said pinions.

15. A railway-vehicle truck comprising an integral motor housing and truck-frame member, a plurality of wheel axles for carrying said member, a motor provided with an armature shaft mounted in the housing, said armature shaft being independent of the wheel axles, and means for transmitting power from the armature shaft to a wheel axle, said power-transmitting means being disposed to permit relative movement of the armature shaft and the driven wheel axle.

16. A railway-vehicle truck comprising a plurality of wheel axles, an integral motor housing and truck-frame member resiliently supported on the wheel axles, a plurality of motors having independent armature shafts mounted in the housing, and means for transmitting power from the armature shafts to the wheel axles, said power-transmitting means being flexible to permit movement of the armature shafts relative to the driven axles.

17. A railway-vehicle truck comprising a unitary motor housing and truck-frame member, a wheel axle resiliently mounted in the frame member, a motor mounted in the housing and means for transmitting power from the motor to the resiliently mounted axle.

18. A railway-vehicle truck comprising an integral motor housing and truck-frame member, a plurality of wheel axles for carrying said member, a motor provided with an armature shaft mounted in the housing, said armature shaft being independent of the wheel axles, and a gear train for transmitting power from the motor to a wheel axle, said gear train comprising a pinion member and a spherically seated gear-wheel.

19. A railway-vehicle truck comprising an integral motor housing and truck frame member, a plurality of wheel axles for carrying said member, a motor provided with an armature shaft mounted in the housing, said armature shaft being independent of the wheel axles, and a gear train for transmitting power from the motor to a wheel axle, said gear train comprising a pinion member and a spherically seated flexible gear-wheel.

20. A railway-vehicle truck comprising a wheel axle, a unitary motor housing and truck-frame member resiliently mounted on the wheel axle, a motor mounted in the motor housing, a driving pinion mounted on the motor and a spherically seated flexible gear wheel mounted on the wheel axle for cooperating with the pinion on the motor to transmit power to the wheel axle.

In testimony whereof, I have hereunto subscribed my name this 18th day of September, 1923.

CLAUDE BETHEL.